US009500520B2

(12) United States Patent
Ohkubo et al.

(10) Patent No.: US 9,500,520 B2
(45) Date of Patent: Nov. 22, 2016

(54) OPTICAL MEASUREMENT APPARATUS (75) Inventors: Kazuaki Ohkubo, Kusatsu (JP); Hisashi Shiraiwa, Koka (JP)

(73) Assignee: OTSUKA ELECTRONICS CO., LTD., Osaka (JP)

( * ) Notice: Subject to any disclaimer, the term of this patent is extended or adjusted under 35 U.S.C. 154(b) by 84 days.

(21) Appl. No.: 14/378,002

(22) PCT Filed: Jul. 30, 2012

(86) PCT No.: PCT/JP2012/069322
§ 371 (c)(1),
(2), (4) Date: Aug. 11, 2014

(87) PCT Pub. No.: WO2014/020660
PCT Pub. Date: Feb. 6, 2014

(65) Prior Publication Data
US 2015/0260569 A1 Sep. 17, 2015

(51) Int. Cl.
*G01J 1/06* (2006.01)
*G01J 1/04* (2006.01)
(Continued)

(52) U.S. Cl.
CPC ............... *G01J 1/06* (2013.01); *G01J 1/0223* (2013.01); *G01J 1/0403* (2013.01); *G01J 1/4257* (2013.01); *G01J 1/0488* (2013.01); *G01J 2001/4247* (2013.01)

(58) Field of Classification Search
CPC .... G01J 1/0403; G01J 1/0488; G01J 1/4257; G01J 1/06; G01J 1/0223; G01J 1/0242; G01J 2001/4252; G01J 2001/4247; G01J 3/504; G01N 2021/575; G01N 23/20016
See application file for complete search history.

(56) References Cited

U.S. PATENT DOCUMENTS 4,834,535 A 5/1989 Cammann
5,914,777 A 6/1999 Imura
(Continued)

FOREIGN PATENT DOCUMENTS

CN 101158600 A 4/2008
JP S63-500540 A 2/1988
(Continued)

OTHER PUBLICATIONS

An Office Action; "Grounds for Rejection," issued by the Chinese Patent Office on Sep. 25, 2015, which corresponds to Chinese Patent Application No. 201280072460.4 and is related to U.S. Appl. No. 14/378,0012; with English language translation.
(Continued)

*Primary Examiner* — John Lee
(74) *Attorney, Agent, or Firm* — Studebaker & Brackett PC (57) ABSTRACT

An optical measurement apparatus includes: a hollow cylindrical member having one plane with a first opening and the other plane with a second opening; a rotation mechanism for rotating the cylindrical member about a first axis; a support unit for arranging a light source at a measurement position which is on the first axis and from which the emitted light enters the cylindrical member through the first opening; a first reflection unit arranged inside the cylindrical member for reflecting the light emitted from the light source and entering through the first opening; a second reflection unit for reflecting the light inside the cylindrical member and propagating the light through the second opening along the first axis to the outside of the cylindrical member; and at least one third reflection unit for causing the light reflected by the first reflection unit to be incident on the second reflection unit.

10 Claims, 10 Drawing Sheets (51) Int. Cl.
*G01J 1/42* (2006.01)
*G01J 1/02* (2006.01)

(56) References Cited

U.S. PATENT DOCUMENTS

| | | | | |
|---|---|---|---|---|
| 6,366,350 | B1* | 4/2002 | Thornburg | G01J 1/04 356/222 |
| 7,022,969 | B2* | 4/2006 | Bulpitt | G01J 1/42 250/216 |
| 7,800,745 | B2* | 9/2010 | Pan | G01J 1/02 356/121 |
| 8,467,046 | B2* | 6/2013 | Mou | G01J 1/02 356/213 |
| 8,970,835 | B2* | 3/2015 | Ohkubo | G01J 3/0254 250/231.13 |
| 9,127,832 | B2* | 9/2015 | Shiraiwa | F21V 21/14 |
| 2004/0165642 | A1* | 8/2004 | Lamont | G02B 26/10 372/107 |
| 2006/0023222 | A1 | 2/2006 | Binder et al. | |
| 2008/0304049 | A1 | 12/2008 | Pan | |
| 2010/0108869 | A1* | 5/2010 | Iguchi | G01J 1/02 250/228 |
| 2010/0328672 | A1 | 12/2010 | Mou | |
| 2011/0195531 | A1* | 8/2011 | Sohn | G01J 1/04 438/16 |
| 2012/0081700 | A1* | 4/2012 | Kuo | G01J 1/0242 356/222 |
| 2012/0194820 | A1* | 8/2012 | Kuo | G01J 1/0242 356/446 |
| 2014/0021338 | A1* | 1/2014 | Ohkubo | G01J 3/0254 250/216 |
| 2014/0021340 | A1* | 1/2014 | Ohkubo | G01J 3/0254 250/227.11 |
| 2014/0078496 | A1* | 3/2014 | Cheng | G01J 1/0204 356/236 |
| 2014/0132958 | A1* | 5/2014 | O'Toole | G01J 1/0271 356/445 |
| 2014/0327912 | A1* | 11/2014 | Kettler | G01N 21/57 356/445 |
| 2015/0260569 | A1* | 9/2015 | Ohkubo | G01J 1/0403 250/234 |

FOREIGN PATENT DOCUMENTS

| | | |
|---|---|---|
| JP | H04-315926 A | 11/1992 |
| JP | H06-022099 A | 1/1994 |
| JP | H07-294328 A | 11/1995 |
| JP | H10-090056 A | 4/1998 |
| JP | H10-206231 A | 8/1998 |
| JP | 2003-247888 A | 9/2003 |
| JP | 2005-069760 A | 3/2005 |
| JP | 2006-047310 A | 2/2006 |

OTHER PUBLICATIONS

International Search Report; PCT/JP2012/069322; Oct. 2, 2012.
JIS C8105-5:2011; "Luminaires-Part 5: Gonio-photometric methods"; Japanese Standards Association; Dec. 20, 2011.

* cited by examiner

OPTICAL MEASUREMENT APPARATUS

TECHNICAL FIELD

The present invention relates to an optical measurement apparatus for detecting light emitted from a light source in relation to a radiation angle.

BACKGROUND ART

As an index for evaluating the performance of a light source, a radiation characteristic is known. The luminous intensity distributions are a typical example of such a radiation characteristic. The luminous intensity distributions mean variation or distributions of the luminous intensity depending on the angle. As such luminous intensity distributions, both the absolute luminous intensity and the relative luminous intensity are used. The luminous intensity distributions of the absolute luminous intensity are used for determining the total luminous flux generated by a light source, for example. In contrast, the luminous intensity distributions of the relative luminous intensity are used for determining a light distribution pattern, for example.

The related art of the apparatus for measuring such luminous intensity distributions are disclosed for example in Japanese Patent Laying-Open No. 07-294328 (PTD 1) and Japanese Patent Laying-Open No. 2003-247888 (PTD 2).

The Japanese Industrial Standards specify measurement of the luminous intensity distributions under JIS C8105-5: 2011 "Luminaires-Part 5: Gonio-photometric methods" (NPD 1).

Generally, in the case where the luminous intensity distributions of a light source like a large-sized lighting device is to be measured, a measurement apparatus is employed that is configured to have a plane mirror rotated to thereby direct the light emitted from the light source to an optical receiver. In such a measurement apparatus, typically the light source to be measured is arranged rotatably about a vertical axis while the plane mirror is arranged rotatably about a horizontal axis. The light distributions measurement apparatus is roughly classified into two types. One is a system in which a plane mirror is rotated at the center and a light source is rotated around the plane mirror (hereinafter also referred to as "Moving Sample System"), and the other is a system in which a plane mirror is rotated around a light source (hereinafter also referred to as "Moving Mirror System").

More specifically, the Moving Sample System is configured so that a line connecting the center of the plane mirror and the optical receiver is identical to the rotational axis of the plane mirror. It is easy for this system to change the photometric distance (the distance from the light source to the optical receiver) depending on the size of the light source or the amount of light from the light source. In the case of the Moving Mirror System, a line connecting the photometric center of the light source and the optical receiver is identical to the rotational axis of the plane mirror. This system cannot change the photometric distance.

CITATION LIST

Patent Document

PTD 1: Japanese Patent Laying-Open No. 07-294328
PTD 2: Japanese Patent Laying-Open No. 2003-247888

Non Patent Document

NPD 1: JIS C8105-5: 2011 "Luminaires-Part 5: Gonio-photometric methods," Japanese Standards Association, established on Dec. 20, 2011

SUMMARY OF INVENTION

Technical Problem

The above-described Moving Sample System has the invariable optical axis extending from the plane mirror to the optical receiver and is therefore advantageous in terms of measurement. However, the light source is spatially moved while being measured, which leads to a problem in the case where a light source like a discharge lamp whose characteristics vary depending on the posture or a light source like an LED lighting device whose characteristics vary depending on the ambient temperature is to be measured, namely a problem that the characteristics are unstable.

In contrast, the Moving Mirror System moves the plane mirror around the light source and keeps the light source stationary, and therefore has advantages that the ambient temperature can be kept constant and the characteristics of the light source during measurement can be made stable. However, the fact that the optical axis extending from the plane mirror to the optical receiver varies leads to a problem that the system is prone to be influenced by the characteristics of the angle at which the optical receiver receives light, and a problem of difficulty in coping with stray light.

An object of the present invention is to provide a new optical measurement apparatus for detecting light emitted from a light source in relation to a radiation angle, which is distinguished from the configurations and methods disclosed in the related art documents as referenced above.

Solution to Problem

According to an aspect of the present invention, an optical measurement apparatus for detecting light emitted from a light source in relation to a radiation angle is provided. The optical measurement apparatus includes: a hollow cylindrical member having one plane with a first opening and the other plane with a second opening; a rotation mechanism for rotating the cylindrical member about a first axis which is a central axis of the cylindrical member; a support unit for arranging the light source at a measurement position which is located on the first axis and from which the emitted light enters the cylindrical member through the first opening; a first reflection unit arranged inside the cylindrical member for reflecting the light emitted from the light source and entering through the first opening; a second reflection unit for reflecting the light inside the cylindrical member and propagating the light through the second opening along the first axis to the outside of the cylindrical member; and at least one third reflection unit for causing the light reflected by the first reflection unit to be incident on the second reflection unit.

Preferably, the support unit is configured to be capable of rotating the light source about a second axis orthogonal to the first axis.

Preferably, the rotation mechanism includes a roller rotationally supporting the cylindrical member.

Preferably, the optical measurement apparatus further includes an optical receiver unit arranged on the first axis.

Preferably, the support unit includes: an arm for supporting a plurality of light sources; and means for revolving the arm to replace a light source arranged at the measurement position in turn.

Preferably, the third reflection unit includes a plurality of reflection units arranged to direct the light from the light source in a direction orthogonal to the first axis.

More preferably, the third reflection unit is configured to cause the light from the light source to at least partially revolve around the first axis.

Advantageous Effects of Invention

In accordance with the present invention, a new optical measurement apparatus for detecting light emitted from a light source in relation to a radiation angle can be implemented.

DESCRIPTION OF EMBODIMENTS

Embodiments of the present invention will be described in detail with reference to the drawings. It should be noted that the same or corresponding components in the drawings are denoted by the same reference characters and a description thereof will not be repeated.

<A. Overall Configuration>

An optical measurement apparatus 1 according to the present embodiment detects light emitted from a light source to be measured, in relation to a radiation angle. More specifically, optical measurement apparatus 1 measures the luminous intensity at each of a plurality of positions in a spatial coordinate system having the center where the light source is located, to thereby obtain the spatial distributions of the luminous intensity of the light source. In the following, a description will be given of an example where the luminous intensity distributions of a light source, as a typical example of the optical radiation characteristic, are measured.

Figure 1:
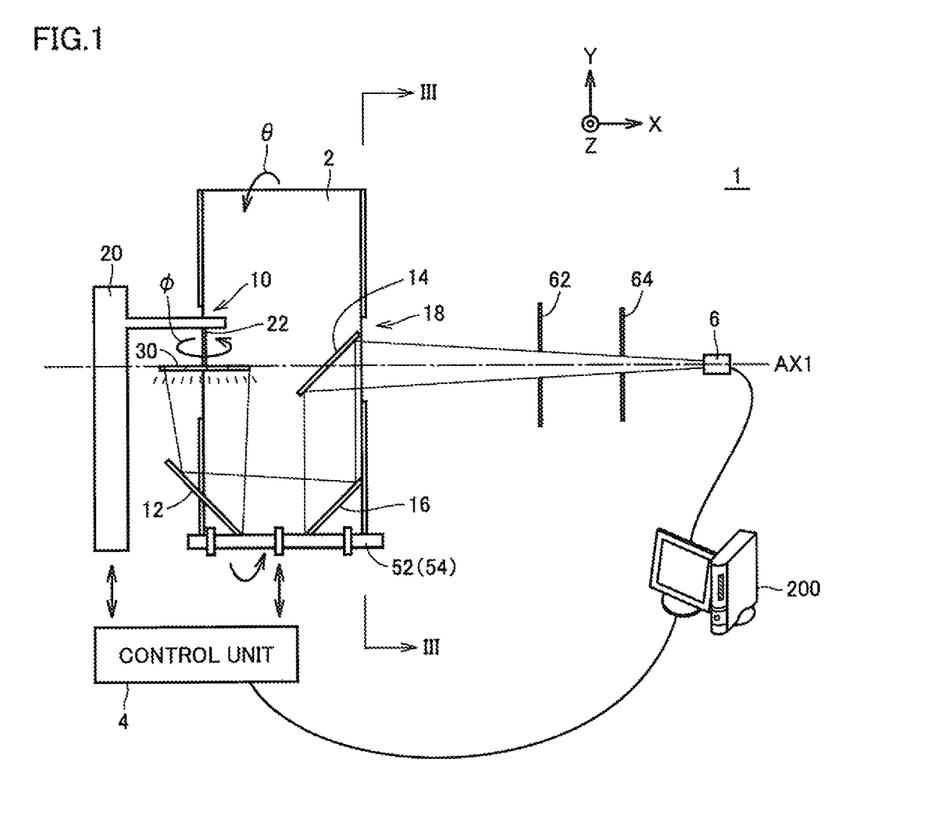
FIG. 1 is a side cross-sectional view of an optical measurement apparatus according to an embodiment of the present invention.
Figure 2:
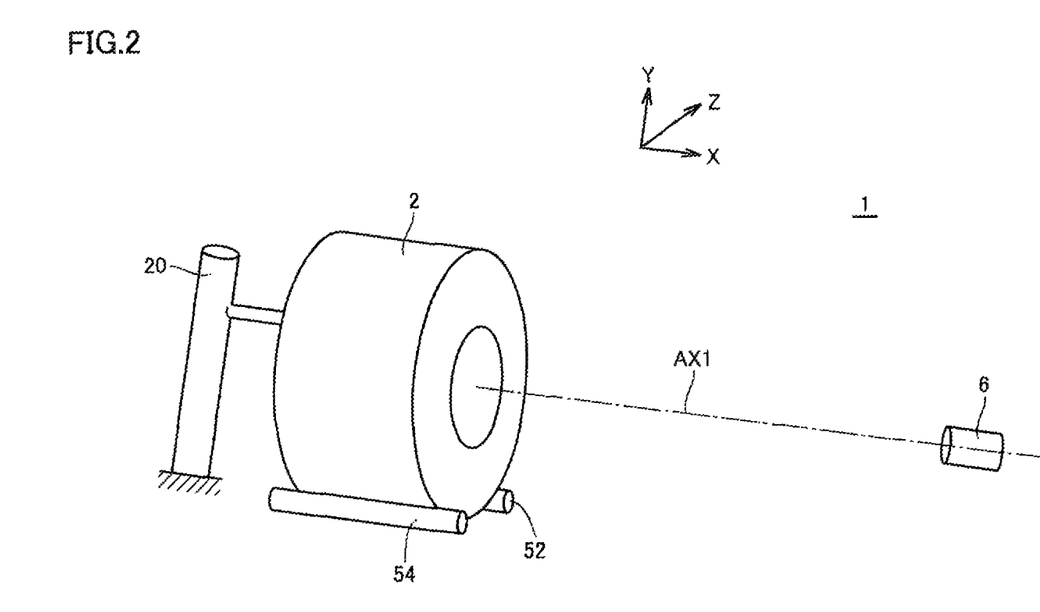
FIG. 2 is a perspective view showing an overall configuration of the optical measurement apparatus according to an embodiment of the present invention.
Figure 3:
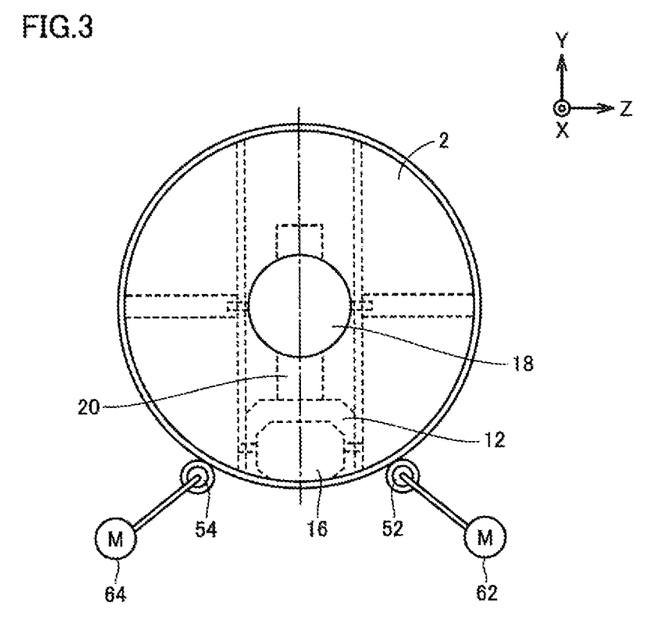
FIG. 3 is a cross-sectional view along a line III-III in FIG. 1.

First, a configuration of optical measurement apparatus 1 will be described. FIG. 1 is a side cross-sectional view of optical measurement apparatus 1 according to an embodiment of the present invention. FIG. 2 is a perspective view showing an overall configuration of optical measurement apparatus 1 according to an embodiment of the present invention. FIG. 3 is a cross-sectional view along a line III-III in FIG. 1.

Referring to FIGS. 1 to 3, optical measurement apparatus 1 includes a hollow drum 2. A light source 30 arranged on one plane (end surface) side of drum 2 is lit, while an optical receiver unit 6 arranged on the other plane (end surface) side of drum 2 receives the light from light source 30, and accordingly the luminous intensity of light source 30 is measured. Drum 2 has, in the one plane (end surface), a light source window 10 which is an opening for arranging light source 30 therein and also has, in the other plane (end surface), an observation window 18 which is an opening for extracting the light from light source 30.

In the case where the luminous intensity distributions are to be measured, drum 2 is rotated about the X axis while light source 30 is rotated about the Y axis to thereby allow the light emitted from light source 30 to be measured for each radiation angle. Drum 2 is arranged rotatably about the X axis which is the central axis of drum 2 (the central axis is identical to optical axis AX1). Namely, optical measurement apparatus 1 includes a rotation mechanism for rotating drum 2 about its central axis. The rotational angle, about the X axis, of drum 2 is represented herein by θ. For example, rotational angle θ is defined as falling in a range of $-180° \leq \theta \leq 180°$ with respect to a predetermined initial state as a reference (0°). It should be noted that in many cases measurement in a range of $-90° \leq \theta \leq 90°$ may practically be sufficient.

In relation to light source window 10 of drum 2, a light source support unit 20 is arranged. Light source support unit 20 is configured to arrange light source 30 at a predetermined position and provide a power source for lighting light source 30. The center of a light emission surface of light source 30 is located on the central axis of drum 2 (optical axis AX1). Namely, light source support unit 20 is configured to arrange light source 30 at a position (measurement position) which is located on the central axis of drum 2 and from which the emitted light enters drum 2 through light source window 10.

Light source 30 is supported by an arm 22 of light source support unit 20, and arm 22 is rotatable about the Y axis. Light source 30 is rotated as required about the Y axis. Namely, light source support unit 20 is configured to be capable of rotating light source 30 about the Y axis which is orthogonal to the central axis of drum 2. The angle by which light source 30 is rotated about the Y axis by light source support unit 20 is represented by φ. For example, rotational angle φ is defined as falling in a range of $-180° \leq \phi \leq 180°$ with respect to a predetermined initial state as a reference (0°).

In drum 2, plane mirrors 12, 14, 16 are provided. The light from light source 30 enters drum 2 to be directed to optical receiver unit 6 via plane mirror 12, plane mirror 14, and plane mirror 16. Namely, in drum 2, three plane mirrors are fixed and, with light source 30 arranged on the central axis of drum 2 lit, drum 2 is rotated. As drum 2 is rotated, plane mirror 12 is also rotated around light source 30 and receives the light, at each radiation angle, from light source 30. Plane mirrors 14 and 16 direct the light reflected from plane mirror 12 outward from the rotational center (observation window 18) of drum 2. Optical receiver unit 6 receives the light ejected from drum 2.

Plane mirror 12 reflects the light from light source 30 in a predetermined direction. Plane mirror 12 is fixed on drum 2 and therefore rotated around the X axis as drum 2 is rotated. The center of the light emission surface of light source 30 is located on the central axis of drum 2 and therefore, the distance from light source 30 to plane mirror 12 is kept constant regardless of the rotational angle of drum 2. Namely, regardless of which rotational position drum 2 is located, the field of view of plane mirror 12 always includes light source 30. Thus, optical measurement apparatus 1 includes plane mirror 12 arranged inside drum 2 to reflect the light from light source 30 that has entered through light source window 10.

Plane mirror 14 is fixed in relation to observation window 18. Plane mirror 14 reflects the light inside drum 2 to cause the light to propagate through observation window 18 along the central axis of drum 2 (optical axis AX1) to the outside of drum 2. Plane mirror 14 is configured to direct the reflected light toward optical receiver unit 6 regardless of which rotational position drum 2 is located.

Plane mirror 16 causes the light reflected from plane mirror 12 to be incident on plane mirror 14. In the example shown in FIG. 1, the illustrated configuration has one plane mirror 16 between plane mirror 12 and plane mirror 14. Instead, a plurality of plane mirrors may be arranged therebetween.

Optical receiver unit 6 is arranged on the central axis of drum 2 (optical axis AX1) to detect the luminous intensity of the light emitted from light source 30, namely the light ejected from drum 2. Optical receiver unit 6 outputs to a processing device 200 a value indicating the luminous intensity (intensity) of the light it received. As optical receiver unit 6, a device such as photodiode detecting the intensity of light may be employed, or a spectroscopic detector for detecting the intensity (spectrum) for each wavelength may be employed. In addition, optical receiver unit 6 includes a lens system for collecting light, for example.

Basically, the luminous intensity distributions are measured by optical measurement apparatus 1 in a darkroom. A longer photometric distance between drum 2 and optical receiver unit 6, however, may cause stray light generated in any part on the optical path to be mixed in. Such stray light becomes a factor of a measurement error. Therefore, it is preferable to provide light shielding plates 62, 64 on the optical path between drum 2 and optical receiver unit 6. Light shielding plates 62, 64 restrict the optical path (diameter of the optical path) of the light ejected from drum 2 to thereby prevent stray light from being mixed in.

Optical measurement apparatus 1 includes a control unit 4 for controlling rotation of drum 2 as well as rotation and lighting of light source 30. Control unit 4 is connected to processing device 200 and rotates rollers 52, 54 and arm 22 in accordance with instructions from processing device 200.

Processing device 200 stores the detection result (value representing the luminous intensity) obtained by optical receiver unit 6, in association with rotational angle θ of drum 2 and rotational angle φ of light source support unit 20 at the time the detection was done. Namely, for each combination of rotational angle θ and rotational angle φ, processing device 200 stores the detection result. The stored results of detection give the spatial distributions of the luminous intensity, namely the luminous intensity distributions, of light source 30.

<B. Rotation Mechanism>

As described above, optical measurement apparatus 1 includes the rotation mechanism for rotating drum 2 about its central axis. Any mechanism may be employed as long as it is capable of rotationally driving drum 2. For example, a central portion of drum 2 and a motor may be mechanically coupled together and the motor rotationally drive and thereby rotate drum 2.

In the present embodiment, a configuration is employed as shown in FIGS. 1 to 3 in which rollers 52 and 54 rotationally supporting drum 2 are arranged and rollers 52 and 54 are rotationally driven to rotate drum 2. The drive mechanism having rollers 52 and 54 provided under the outer circumferential surface of drum 2 to rotate drum 2 can be employed to make the apparatus compact. In addition, as compared with a configuration of rotationally driving an arm itself which supports the mirror or an arm itself which supports the light source, the electric power necessary for rotationally driving drum 2 can be reduced. Further, since the drive mechanism is located outside the outer circumferential surface of drum 2, user's access to light source 30 can further be facilitated.

While FIG. 3 shows a configuration in which rollers 52 and 54 arranged under drum 2 support and rotate drum 2, the rotation mechanism is not limited to this. For example, a follower roller which rotatably supports drum 2 and a driver roller which rotationally drives drum 2 may separately be arranged.

<C. State of Measurement>

Figure 4:
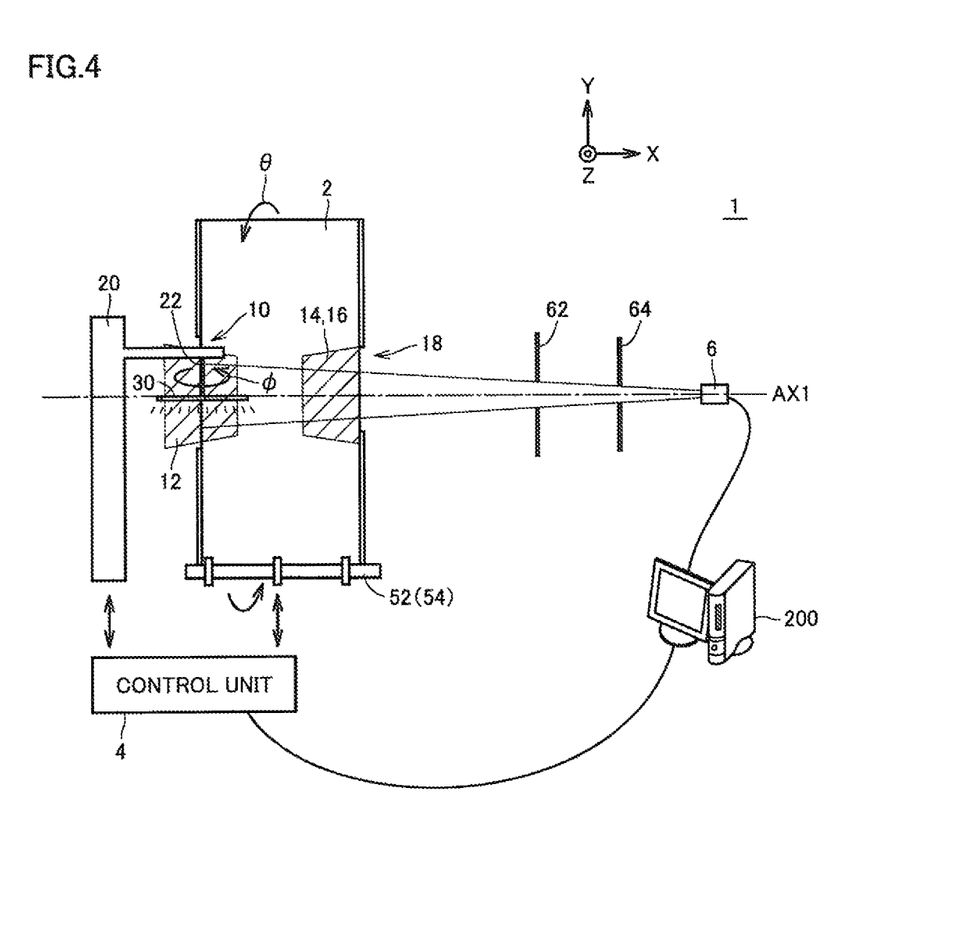
FIG. 4 is a diagram showing a state where a drum shown in FIG. 1 is rotated about the X axis by 90°.

FIG. 4 is a diagram showing a state where drum 2 shown in FIG. 1 has been rotated about the X axis by 90°. In FIG. 1, a state is shown where the light emitted vertically downward from light source 30 is measured. In contrast, FIG. 4 shows a state where the light emitted horizontally inward from light source 30 is measured. In both the states of measurement shown respectively in FIGS. 1 and 4, a component to be measured, which is a component of the light emitted from light source 30, is first incident on plane mirror 12 and thereafter enters optical receiver unit 6 via plane mirrors 14 and 16. The optical path from light source 30 to optical receiver unit 6 is kept extending over the same optical distance regardless of which rotational position drum 2 is located. Accordingly, the luminous intensity distributions of light source 30 can be measured.

<D. Processing Device>

Figure 5:
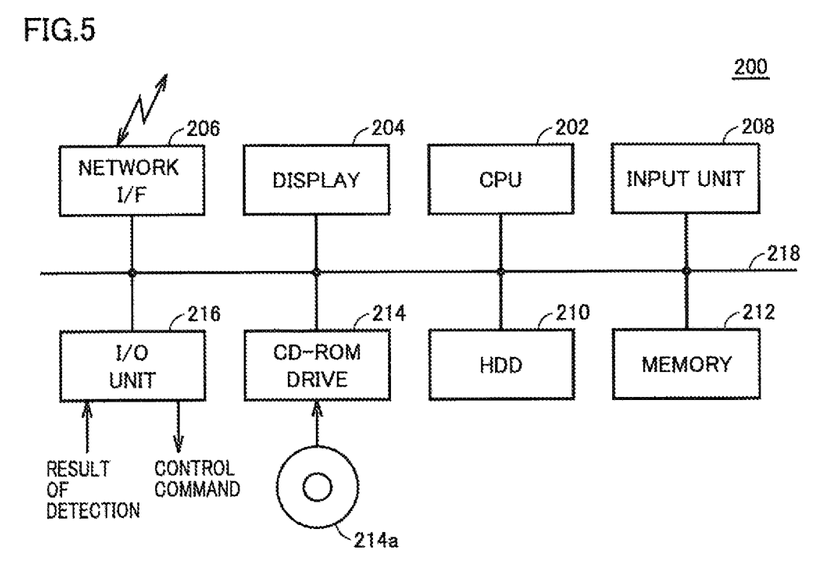
FIG. 5 is a schematic diagram showing a hardware configuration of a processing device according to an embodiment of the present invention.

Next, a description will be given of processing device 200 according to the present embodiment. FIG. 5 is a schematic diagram showing a hardware configuration of processing device 200 according to the embodiment of the present invention.

Referring to FIG. 5, processing device 200 is typically implemented by a computer. Specifically, processing device 200 includes a CPU (Central Processing Unit) 202 executing a variety of programs including operating system (OS: Operating System), a memory 212 temporarily storing data necessary for CPU 202 to execute the programs, and a hard disk (HDD: Hard Disk Drive) 210 storing, in a non-volatile manner, the programs executed by CPU 202. In hard disk 210, a program for implementing processing relevant to measurement of the luminous intensity distributions are stored in advance. Such a program is read by a CD-ROM drive 214 from a CD-ROM (Compact Disk-Read Only Memory) 214a or the like. Alternatively, CPU 202 may receive through a network interface (I/F) 206 the program given from a server apparatus or the like over a network, and store it in hard disk 210.

CPU 202 receives through an I/O (Input Output) unit 216 the result of detection by optical receiver unit 6, and provides a variety of control commands to optical measurement apparatus 1. CPU 202 receives instructions given from a user for example through an input unit 208 made up of a keyboard, a mouse, and the like, and outputs to a display 204 the luminous intensity distributions calculated through execution of the program, for example.

A part or the whole of the functions given in processing device 200 may be implemented by a dedicated hardware.

<E. Electrical Configuration>

Figure 6:
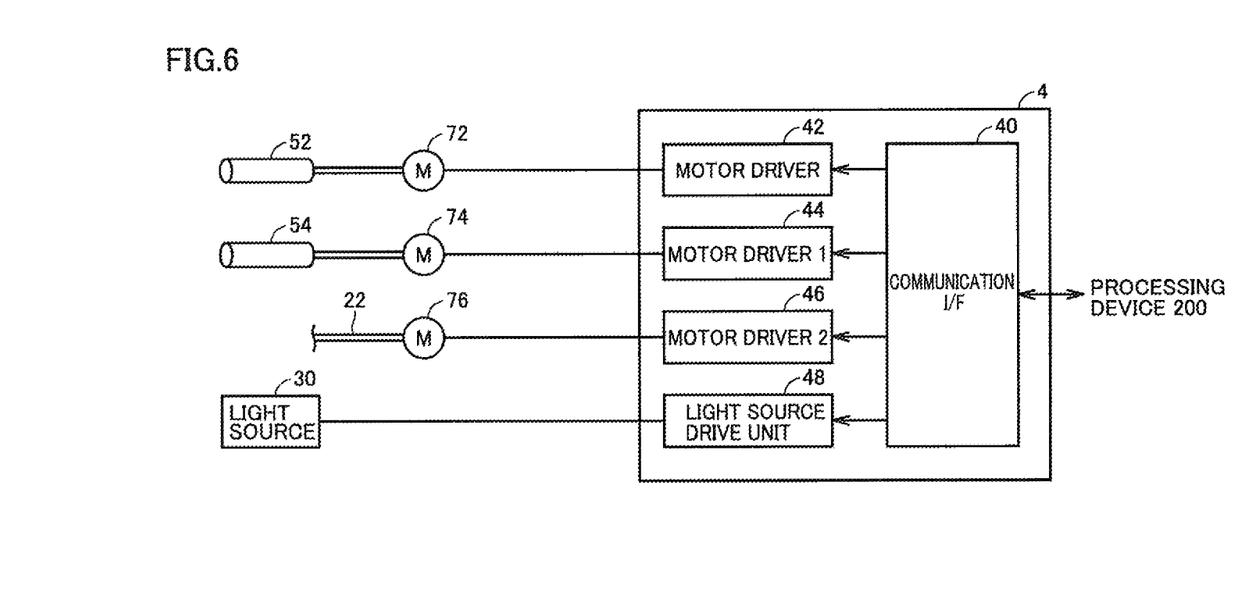
FIG. 6 is a schematic diagram showing an electrical configuration of the optical measurement apparatus according to an embodiment of the present invention.

Next, a description will be given of an electrical configuration of optical measurement apparatus 1 according to the present embodiment. FIG. 6 is a schematic diagram showing the electrical configuration of optical measurement apparatus 1 according to the embodiment of the present invention.

Referring to FIG. 6, optical measurement apparatus 1 further includes motors 72 and 74 rotationally driving rollers 52 and 54, respectively, and a motor 76 rotationally driving arm 22 of light source support unit 20. Preferably, motors 72, 74, 76 are each a stepping motor capable of controlling the rotational position (phase) so that the rotational angle can be controlled with higher precision.

Further, control unit 4 includes a communication interface (I/F) 40, motor drivers 42, 44, 46, and a light source drive unit 48 supplying electric power for lighting light source 30. Communication interface 40 decodes control commands from processing device 200 and provides internal commands to motor drivers 42, 44, 46 and light source drive unit 48.

Following the internal commands from communication interface 40, motor drivers 42, 44, 46 drive motors 72, 74, 76, respectively. Following the internal command from communication interface 40, light source drive unit 48 generates electric power for lighting light source 30.

Control unit 4 may detect rotational angle θ of drum 2 and rotational angle φ of light source 30 based on feedback signals (pulse signals or the like) from motors 72, 74, 76 and output the detected values of the angles to processing device 200.

<F. First Modification (Shortening of Measurement Standby Time Due to Aging)>

In order to accurately measure the radiation characteristic of light source 30, it is necessary to sufficiently age light source 30 before the start of measurement. Aging is an operation of keeping light source 30 lit until the light source reaches a stable state. In the following, a description will be given of a modification that enables shortening of the measurement standby time due to such aging.

Figure 7:
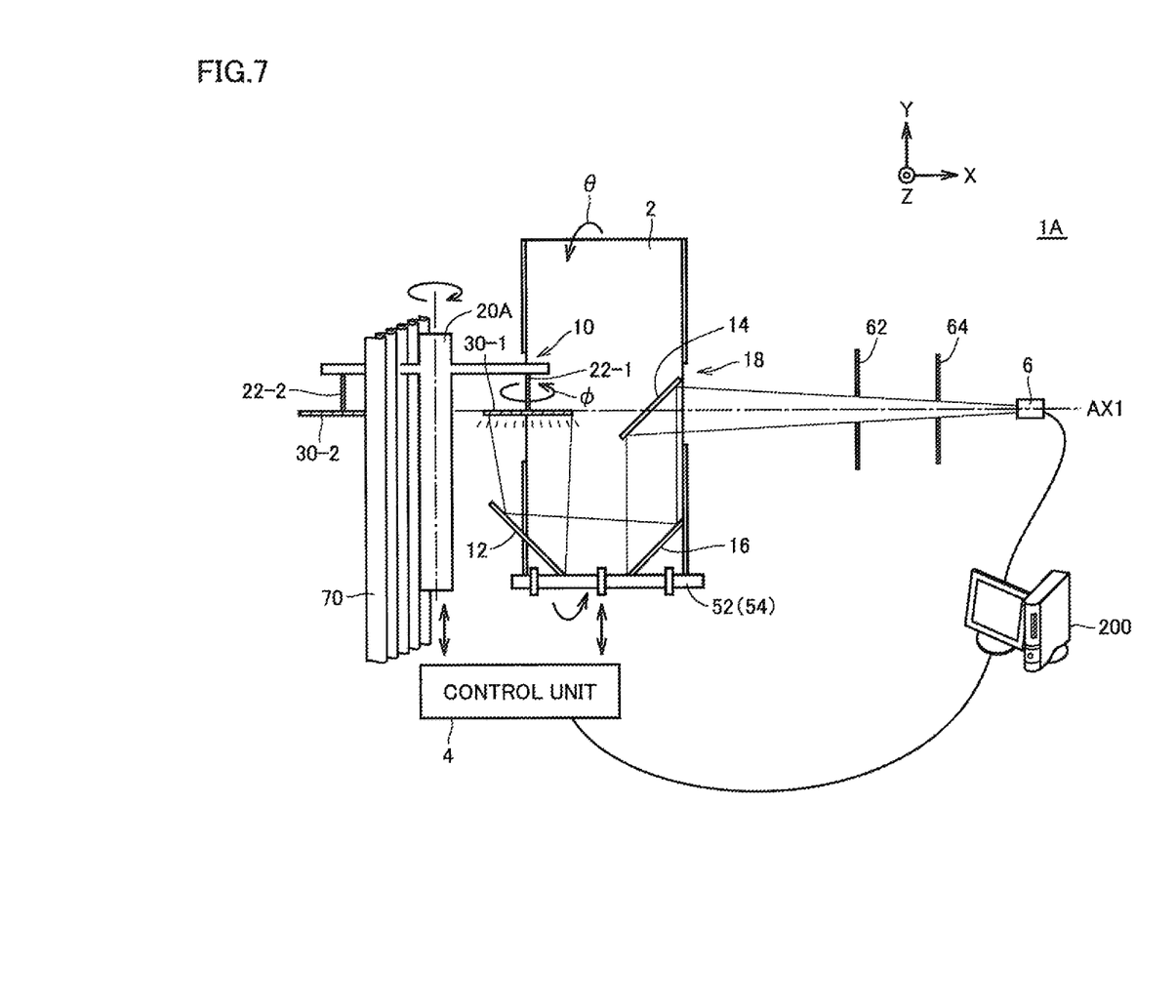
FIG. 7 is a schematic diagram showing an optical measurement apparatus according to a first modification of an embodiment of the present invention.

FIG. 7 is a schematic diagram showing an optical measurement apparatus 1A according to a first modification of an embodiment of the present invention. Optical measurement apparatus 1A shown in FIG. 7 differs from optical measurement apparatus 1 shown in FIG. 1 in that the former has a light source support unit 20A arranged instead of light source support unit 20. As to other features, optical measurement apparatus 1A is similar to optical measurement apparatus 1 shown in FIG. 1, and therefore the detailed description thereof will not be repeated.

Light source support unit 20A is capable of supporting and lighting a plurality of light sources 30 (two light sources 30 in the example shown in FIG. 7). More specifically, light source support unit 20A has two arms 22-1, 22-2 and light sources 30 can be attached to these arms, respectively. Further, light source support unit 20A is rotatable about the Y axis to alternately arrange, at the measurement position, light sources 30 attached respectively to arms 22-1, 22-2. Namely, light source support unit 20A includes arms 22-1, 22-2 for supporting a plurality of light sources 30, and revolves arms 22-1, 22-2 to thereby replace light source 30 arranged at the measurement position in turn. Three or more arms may be provided so that a greater number of light sources 30 can be aged in parallel.

The configuration as described above can be employed to simultaneously light a plurality of light sources 30. Namely, while one light source 30 is lit for being measured, other light sources 30 can be lit for being aged. It should be noted that the light is blocked between arm 22-1 and arm 22-2 by means of a screen 70 or the like and therefore, the light emitted from light source 30 which is being aged will not cause a measurement error.

In accordance with the present modification, measurement of the radiation characteristic of a certain light source 30 and aging of another light source 30 can be done in parallel, and thus the measurement standby time due to the aging time can be shortened. In addition, the time taken for replacement of light source 30 arranged at the measurement position can be shortened.

<G. Second Modification (Extension of Photometric Distance)>

Under the above-referenced JIS C8105-5: 2011 "Luminaires-Part 5: Gonio-photometric methods," the photometric distance (distance from light source 30 to optical receiver unit 6) when the luminous intensity distributions are measured is desirably five times or more of the maximum dimension of the light emission surface of the light source (lighting device). For example, the photometric distance is preferably 6 m or more in the case where the luminous intensity distributions of a fluorescent lamp of 1.2 m are measured.

It should be noted the condition that the photometric distance should be five times as long as the maximum dimension of the light emission surface has been determined on the presupposition that even if a light beam emitted from light source 30 spreads 120%, the error of the luminous intensity can be 1% or less. Therefore, in the case where light source 30 has luminous intensity distributions in the form of optical condensing, the photometric distance which is five times as long as the maximum dimension of the light emission surface is insufficient and a longer photometric distance is necessary.

In view of the above, a second modification of the present embodiment will be described in connection with a configuration that enables the photometric distance to be extended.

Figure 8:
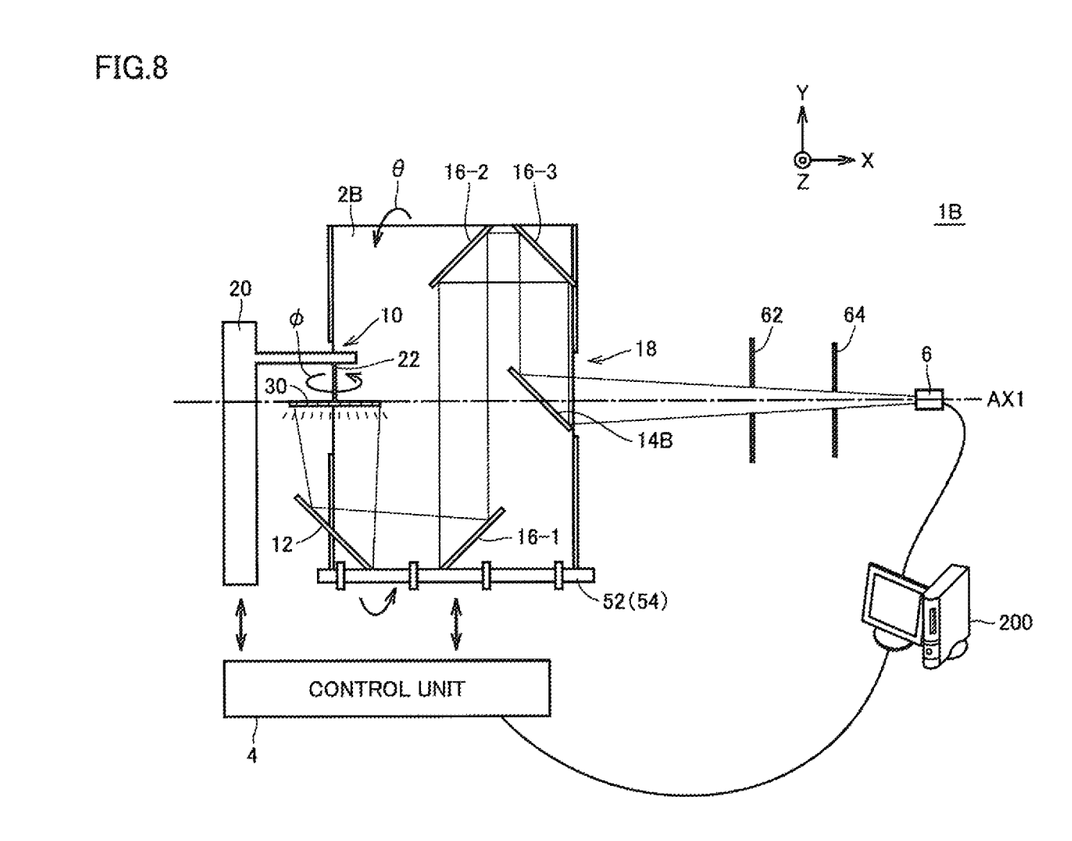
FIG. 8 is a schematic diagram showing an optical measurement apparatus according to a second modification of an embodiment of the present invention.

FIG. 8 is a schematic diagram showing an optical measurement apparatus 1B according to a second modification of the embodiment of the present invention. Optical measurement apparatus 1B shown in FIG. 8 differs from optical measurement apparatus 1 shown in FIG. 1 in that the former has a drum 2B arranged instead of drum 2. As to other features, optical measurement apparatus 1B is similar to optical measurement apparatus 1 shown in FIG. 1, and therefore the detailed description thereof will not be repeated.

Drum 2B includes plane mirrors 16-1, 16-2, 16-3 in addition to plane mirror 12 and a plane mirror 14B. Like plane mirror 14 shown in FIG. 1, plane mirror 14B reflects the light inside drum 2 to direct the light to the outside of drum 2 along optical axis AX1. Plane mirrors 16-1, 16-2, 16-3 form an optical path for directing the light incident on plane mirror 12 to plane mirror 14B. Namely, plane mirrors 16-1, 16-2 direct the light from light source 30 in the direction orthogonal to the X axis to thereby form a longer optical path.

The optical path formed by plane mirrors 16-1, 16-2, 16-3 is longer than the optical path formed by plane mirror 16 shown in FIG. 1, and therefore, a longer photometric distance can be achieved.

While FIG. 8 shows an example where the optical path is formed in which the light from light source 30 propagates along the Y axis upward only once in the page of the drawing, the optical path is not limited to this. An optical path may be formed in which the light propagates upward or downward multiple times in the page of the drawing.

Figure 9:
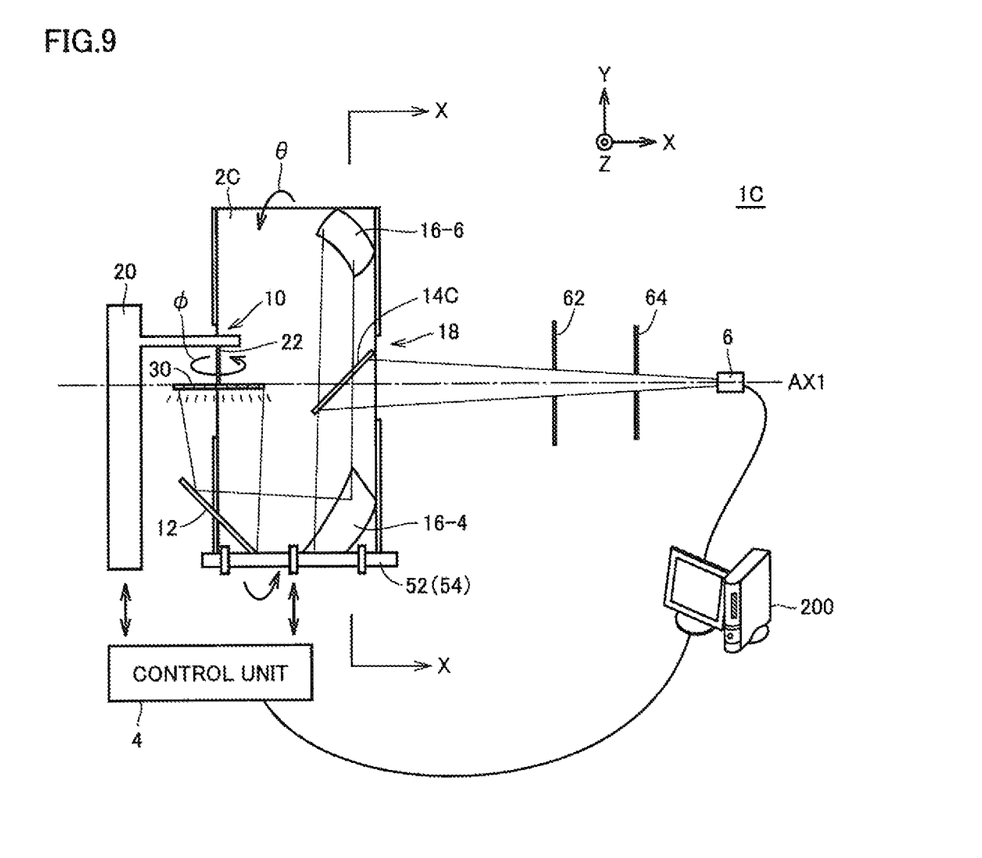
FIG. 9 is a schematic diagram showing another optical measurement apparatus according to the second modification of an embodiment of the present invention.
Figure 10:
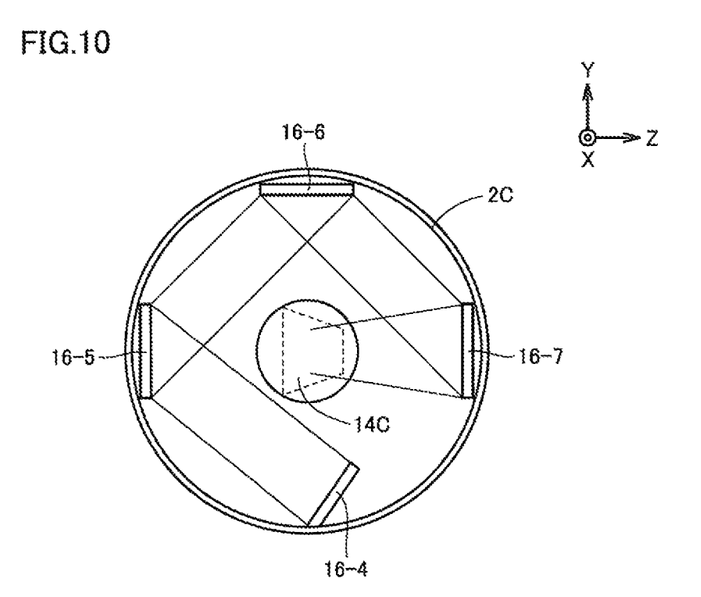
FIG. 10 is a cross-sectional view along a line X-X in FIG. 9.

FIG. 9 is a schematic diagram showing another optical measurement apparatus 1C according to the second modification of the embodiment of the present invention. FIG. 10 is a cross-sectional view along a line X-X in FIG. 9.

Optical measurement apparatus 1C shown in FIG. 9 differs from optical measurement apparatus 1 shown in FIG. 1 in that the former has a drum 2C arranged instead of drum 2. As to other features, optical measurement apparatus 1C is similar to optical measurement apparatus 1 shown in FIG. 1, and therefore the detailed description thereof will not be repeated.

Drum 2C includes, in addition to plane mirror 12 and a plane mirror 14C, plane mirrors 16-4, 16-5, 16-6, 16-7 arranged in a predetermined relationship with each other around the X axis. Like plane mirror 14 shown in FIG. 1, plane mirror 14C reflects the light inside drum 2 to direct the light to the outside of drum 2 along optical axis AX1. Plane mirrors 16-4, 16-5, 16-6, 16-7 form an optical path for directing the light incident on plane mirror 12 to plane mirror 14C. Namely, plane mirrors 16-4, 16-5, 16-6, 16-7 direct the light from light source 30 in the direction orthogonal to the X axis to thereby form a longer optical path. As shown in FIG. 10, plane mirrors 16-4, 16-5, 16-6, 16-7 are configured to cause the light from light source 30 to at least partially revolve around the X axis.

The optical path formed by plane mirrors 16-4, 16-5, 16-6, 16-7 is longer than the optical path formed by plane mirror 16 shown in FIG. 1, and therefore, a longer photometric distance can be achieved.

While FIGS. 9 and 10 show an example where the optical path is formed in which the light from light source 30 revolves clockwise around the X axis by three-fourths of one revolution, the optical path is not limited to this. An optical path in which the light revolves multiple times around the X axis may be formed. Further, the example configuration shown in FIG. 8 and the example configuration shown in FIGS. 9 and 10 may appropriately be combined.

<H. Advantages>

In accordance with the present embodiment, a light distribution measurement apparatus based on a kind of the Moving Mirror System can be implemented. In the present embodiment, light source 30 is not moved and therefore the ambient temperature of light source 30 can be kept constant and the characteristics of light source 30 during measurement can be made stable. Further, the optical axis along which the light ejected from drum 2 propagates to enter optical receiver unit 6 remains unchanged regardless of the rotational angle of drum 2, and therefore, the precision of measurement can be increased.

In accordance with the present embodiment, it is only the observation window 18 that is provided as an opening in the plane from which the light reflected from plane mirror 16 is ejected, and therefore, stray light which enters optical receiver unit 6 can be reduced.

In accordance with the present embodiment, the drive mechanism arranged outside the outer circumferential surface of drum 2 is used, and therefore, the apparatus can be made compact. In addition, since the drive mechanism is located outside the outer circumferential surface of drum 2, user's access to light source 30 can further be facilitated.

It should be construed that the embodiments disclosed herein are by way of illustration in all respects, not by way of limitation. It is intended that the scope of the present invention is defined by claims, not by the description above, and encompasses all modifications and variations equivalent in meaning and scope to the claims.

REFERENCE SIGNS LIST 1, 1A, 1B, 1C optical measurement apparatus; 2, 2B, 2C drum; 4 control unit; 6 optical receiver unit; 10 light source window; 12, 14, 14B, 14C, 16, 16-1 to 16-7 plane mirror; 18 observation window; 20, 20A light source support unit; 22, 22-1, 22-2 arm; 30 light source; 40 communication interface; 42, 44, 46 motor driver; 48 light source drive unit; 52, 54 roller; 62, 64 light shielding plate; 70 screen; 72, 74, 76 motor; 200 processing device; 202 CPU; 204 display; 206 network interface; 208 input unit; 210 hard disk; 212 memory; 214 CD-ROM drive; 216 I/O unit.

The invention claimed is:

1. An optical measurement apparatus for detecting light emitted from a light source in relation to each of radiation angles of the light source, comprising:
   a hollow cylindrical member comprising a pair of planes, a first plane comprising a first opening thereon and a second plane comprising a second opening thereon;
   a rotation mechanism including a roller rotationally supporting the cylindrical member for rotating the cylindrical member about a first axis which is a longitudinal central axis of the cylindrical member;
   an optical receiver unit arranged on the first axis;
   a support unit for arranging the light source at a measurement position which is located on the first axis and from which the emitted light enters the cylindrical member through the first opening;
   a first reflection unit, arranged inside the cylindrical member and at least partially mounted on an inner wall of the cylindrical member, for reflecting the light emitted from the light source and entering through the first opening;
   a second reflection unit at least partially mounted on an inner wall of the cylindrical member for reflecting the light inside the cylindrical member and propagating the light through the second opening along the first axis to the outside of the cylindrical member; and
   at least one third reflection unit at least partially mounted on an inner wall of the cylindrical member for causing the light reflected by the first reflection unit to be incident on the second reflection unit.

2. The optical measurement apparatus according to claim 1, wherein the support unit is configured rotate the light source about a second axis orthogonal to the first axis.

3. The optical measurement apparatus according to claim 1, wherein the support unit includes:
   an arm for supporting a plurality of light sources including the light source and additional one or more light sources; and
   means for revolving the arm to locate the plurality of light sources at the measurement position in turn.

4. The optical measurement apparatus according to claim 1, wherein the third reflection unit includes a plurality of reflection units arranged to direct the light from the light source in a direction orthogonal to the first axis.

5. The optical measurement apparatus according to claim 4, wherein the third reflection unit is configured to cause the light from the light source to at least partially revolve around the first axis.

6. An optical apparatus adapted to an optical measurement apparatus that detects light emitted from a light source in relation to each of radiation angles of the light source, comprising:
- a hollow cylindrical member comprising a pair of planes, a first plane comprising a first opening thereon and a second plane comprising a second opening thereon;
- a rotation mechanism including a roller rotationally supporting the cylindrical member for rotating the cylindrical member about a first axis which is a longitudinal central axis of the cylindrical member;
- a support unit for arranging the light source at a measurement position which is located on the first axis and from which the emitted light enters the cylindrical member through the first opening;
- a first reflection unit, arranged inside the cylindrical member and at least partially mounted on an inner wall of the cylindrical member, for reflecting the light emitted from the light source and entering through the first opening;
- a second reflection unit at least partially mounted on an inner wall of the cylindrical member for reflecting the light inside the cylindrical member and propagating the light through the second opening along the first axis to the outside of the cylindrical member; and at least one third reflection unit at least partially mounted on an inner wall of the cylindrical member for causing the light reflected by the first reflection unit to be incident on the second reflection unit.

7. The optical apparatus according to claim 6, wherein the support unit is configured to rotate the light source about a second axis orthogonal to the first axis.

8. The optical apparatus according to claim 6, wherein the support unit includes:
- an arm for supporting a plurality of light sources including the light source and additional one or more light sources; and
- means for revolving the arm to locate the plurality of light sources at the measurement position in turn.

9. The optical apparatus according to claim 6, wherein the third reflection unit includes a plurality of reflection units arranged to direct the light from the light source in a direction orthogonal to the first axis.

10. The optical apparatus according to claim 9, wherein the third reflection unit is configured to cause the light from the light source to at least partially revolve around the first axis.

* * * * *